(12) United States Patent
Stewart et al.

(10) Patent No.: US 10,571,235 B2
(45) Date of Patent: Feb. 25, 2020

(54) FLANGE CHECK TOOL

(71) Applicant: HONDA MOTOR CO., LTD., Minato-ku, Tokyo (JP)

(72) Inventors: Mark Stewart, Stayner (CA); Shaheer Suleiman Abha, Orangeville (CA)

(73) Assignee: HONDA MOTOR CO., LTD., Tokyo (JP)

( * ) Notice: Subject to any disclaimer, the term of this patent is extended or adjusted under 35 U.S.C. 154(b) by 167 days.

(21) Appl. No.: 15/914,540

(22) Filed: Mar. 7, 2018

(65) Prior Publication Data
US 2019/0277613 A1 Sep. 12, 2019

(51) Int. Cl.
*G01B 3/42* (2006.01)
*G01B 3/14* (2006.01)

(52) U.S. Cl.
CPC ............ *G01B 3/42* (2013.01); *G01B 3/14* (2013.01)

(58) Field of Classification Search
CPC ................ G01B 3/14; G01B 3/42
USPC .......................................... 33/194
See application file for complete search history.

(56) References Cited

U.S. PATENT DOCUMENTS

| | | | | |
|---|---|---|---|---|
| D139,750 S | * | 12/1944 | Snyder | D10/74 |
| 2,514,956 A | * | 7/1950 | Kuebler | G01B 3/26 |
| | | | | 33/501.45 |
| 2,603,880 A | * | 7/1952 | Dunn | E04F 21/003 |
| | | | | 33/194 |
| 3,046,670 A | * | 7/1962 | Wydra | G01B 3/14 |
| | | | | 33/565 |
| 4,419,829 A | * | 12/1983 | Miller | G01B 5/12 |
| | | | | 33/501.08 |
| 4,519,144 A | * | 5/1985 | Larsen | G01B 3/48 |
| | | | | 33/199 R |
| 4,858,330 A | * | 8/1989 | Larsen | G01B 3/48 |
| | | | | 33/199 R |

(Continued)

FOREIGN PATENT DOCUMENTS

| | | |
|---|---|---|
| CN | 203587010 U | 5/2014 |
| DE | 10 2010 046 206 B3 | 10/2011 |

(Continued)

OTHER PUBLICATIONS

"Brake Shoe Table Thickness Gauge", http://www.frasergauge.com/gauges/shoe%20Gauges/409%20Shoe%20Table%20Thickness%20Gauge. Accessed Mar. 22, 2018.

(Continued)

*Primary Examiner* — Yaritza Guadalupe-McCall
(74) *Attorney, Agent, or Firm* — Arent Fox LLP

(57) ABSTRACT

Examples in the disclosure relate to an apparatus for checking whether a flange in a creased sheet of metal conforms to specified dimensions. The tool may include a handle and a first block extending from the handle. The first block may include a slot extending from a distal surface of the block to an interior end, the slot having an interior wall and an opposite exterior wall. The first block may include a shoulder located near the distal surface of the block extending from the interior wall toward the exterior wall and defining a length between the shoulder and the interior end along the interior wall. The length may correspond to a specified length of the flange. The first block may include a beveled edge on the exterior wall corresponding to a specified distance between a surface of the sheet and the flange.

20 Claims, 9 Drawing Sheets

(56) References Cited

U.S. PATENT DOCUMENTS

| | | | | |
|---|---|---|---|---|
| 5,109,609 | A * | 5/1992 | Anderson | G01B 3/30 33/501.05 |
| 5,131,158 | A * | 7/1992 | Wong | G01B 3/50 33/501.45 |
| 5,340,095 | A * | 8/1994 | Eicher | E04F 21/0015 269/242 |
| 6,176,031 | B1 * | 1/2001 | Ramsey | F41C 9/085 42/83 |
| 6,334,258 | B1 * | 1/2002 | Lee | G01B 3/14 33/1 BB |
| 6,886,267 | B1 * | 5/2005 | Karwowski | G01B 5/14 33/501.45 |
| 6,973,739 | B2 | 12/2005 | Ewans | |
| 7,040,151 | B2 * | 5/2006 | Graham | G01B 5/0028 33/600 |
| 7,117,626 | B1 * | 10/2006 | Alzamora | F41A 9/65 42/108 |
| 7,316,069 | B2 * | 1/2008 | Graybeal | B23D 33/02 30/103 |
| 8,251,356 | B2 * | 8/2012 | Eschenburg | E06B 1/60 144/144.1 |
| 9,163,923 | B2 | 10/2015 | McGuire et al. | |
| 9,285,203 | B1 | 3/2016 | Mermoud et al. | |
| 9,428,923 | B1 * | 8/2016 | Christner | E04F 21/0015 |
| 2005/0210690 | A1 * | 9/2005 | Morton | B23B 47/287 33/194 |
| 2008/0047152 | A1 * | 2/2008 | Wilding | E04F 21/0015 33/194 |
| 2009/0033921 | A1 * | 2/2009 | Loftis | F16L 1/10 356/138 |
| 2009/0220314 | A1 * | 9/2009 | Collado Briceno | B23B 47/28 408/241 G |
| 2012/0124853 | A1 * | 5/2012 | Petersheim | G01B 5/14 33/833 |
| 2012/0255186 | A1 * | 10/2012 | Allen | E06B 1/04 33/194 |
| 2015/0020393 | A1 * | 1/2015 | Shallcross | G01B 5/204 33/199 R |
| 2016/0377404 | A1 * | 12/2016 | Berthou | G01B 3/34 33/199 R |
| 2019/0277613 | A1 * | 9/2019 | Stewart | G01B 3/42 |

FOREIGN PATENT DOCUMENTS

| | | |
|---|---|---|
| DE | 20 2013 007 460 U1 | 10/2013 |
| EP | 1671876 B1 | 7/2008 |
| EP | 2 610 579 A1 | 7/2013 |

OTHER PUBLICATIONS

"GearWrench Brake Lining Thickness Gauge" http://www.amazon.com/GearWrench-3962-Brake-Lining-Thickness/dp/B0015DMJ2S. Accessed Mar. 22, 2018.

"Go—No-Go Gauges" http://www.marposs.com/family.php/eng/go_no_go_thread_spline_gauges_flush_pins. Accessed Mar. 22, 2018.

* cited by examiner

FLANGE CHECK TOOL

BACKGROUND

A vehicle door typically includes a structural member, a door skin, and a molding. The door skin is a finished sheet of metal that provides the outside surface of the door. Typically, an edge of the door skin is folded back on itself to form a flange. The molding is used to cover the flange and present an ornamental surface (e.g., chrome). Seals and wipers may also be attached to the molding to contact a door window.

During design and manufacture of a vehicle, the dimensions of the flange may need to be adjusted in order to properly contact and mount the molding. For example, the flange may be trimmed to ensure a proper fit of the molding. The inventors of the present application have discovered that a useful measurement of the flange is a dimension between a free edge of the flange and an exterior surface of the door skin. Additionally, an angle between the door skin and the flange may affect the fit of the molding. Compliance of these measurements to specification ensure, among other things, that the exterior surface of the door skin meets manufacturing specifications and proper fit of the molding. This dimension is difficult to measure because the door skin and the flange itself obstruct standard tools (e.g., calipers or micrometers).

In practice, the flange may be measured by using putty to make a mold of the flange. A cross-section of the mold may then be measured to determine the dimension between the free edge of the flange and the exterior surface of the door skin. This process may be time consuming due to the length of time it takes for the putty to harden.

In view of the foregoing, there is a need for a measurement device for measuring a flange formed by a crease in a sheet of metal. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In an aspect, the disclosure provides an apparatus for checking whether a flange in a creased sheet of metal conforms to specified dimensions. The apparatus may include a handle and a first block extending from the handle. The first block may include a slot extending from a distal surface of the block to an interior end, the slot having an interior wall and an opposite exterior wall. The first block may include a shoulder located near the distal surface of the block extending from the interior wall toward the exterior wall and defining a length between the shoulder and the interior end along the interior wall. The length may correspond to a specified length of the flange. The first block may include a beveled edge on the exterior wall facing the interior wall, wherein a distance between the beveled edge and the interior wall corresponds to a specified distance between a surface of the sheet and the flange.

In another aspect, the disclosure provides a method of measuring a flange in a creased sheet of metal. The method may include providing a tool including a first block having a slot extending from a distal surface of the block to an interior end, the slot having an interior wall and an opposite exterior wall. The method may include inserting a first edge of the flange into the slot. The method may include passing a shoulder located near the edge of the block extending from the interior wall toward the exterior wall past a second edge of the flange. The method may include sliding the tool along the flange.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "vehicle," as used herein, refers to a any moving vehicle that may be capable of carrying one or more human occupants and is powered by any form of energy. The term "vehicle" includes, but is not limited to: cars, trucks, vans, minivans, SUVs, motorcycles, scooters, boats, personal watercraft, and aircraft. In some cases, a motor vehicle includes one or more engines.

Generally described, the present disclosure provides a tool for determining whether a flange in a creased sheet of metal conforms to specified parameters. The flange may, for example, provide for alignment with other parts such as a structural door member or decorative molding. Conformance of the flange to specified parameters ensures that the metal part meets manufacturing specifications and that the metal part integrates with other parts.

The tool includes a block portion having a slot extending from an edge to an interior end. A shoulder is located near the edge and defines a length between the interior end and the shoulder that corresponds to the specified length of the flange. The slot includes a beveled edge opposite the shoulder. The beveled edge corresponds to an angle of the flange. The flange may be placed within the slot such that a creased edge of the flange is located near the internal end and a free edge of the flange abuts the shoulder. The beveled edge may contact a surface of the metal sheet. When the flange conforms to the specified parameters, the tool may be slid along the flange. If one of the parameters of the flange is too great, the tool will be unable to slide along the flange, indicating that the flange does not conform to the specification. The flange may be modified in response to detecting the non-conformance. Accordingly, the tool allows for quickly and easily checking a flange of a door skin to determine compliance with manufacturing specifications. A similar tool may be used to check similar flanges in other sheet metal parts such as body panels.

Figure 1:
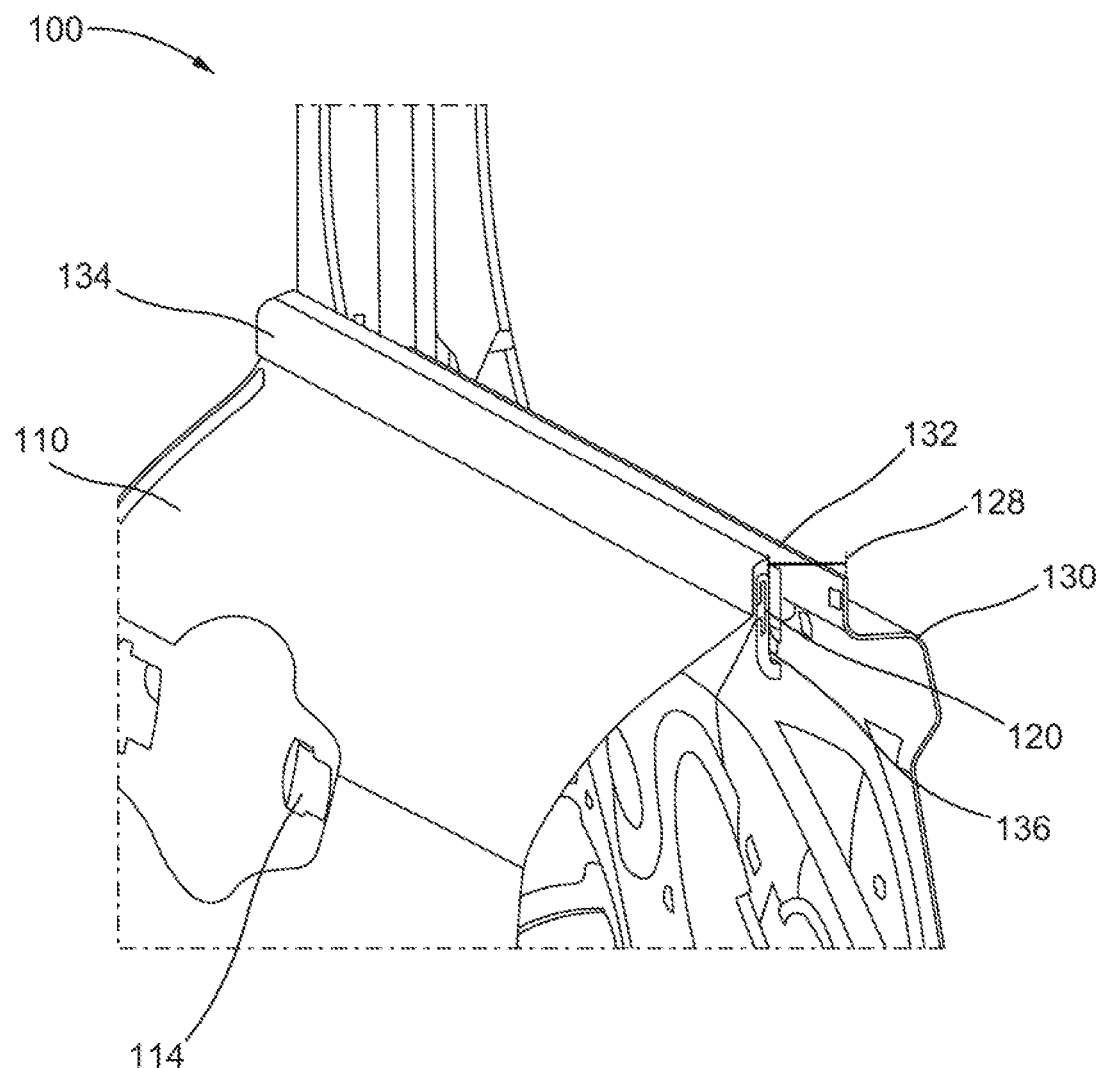
FIG. 1 is a perspective view showing example components of a vehicle door.

Turning to FIG. 1, a perspective view of a vehicle door 100 shows a door skin 110 and a structural member 130. The door skin 110 is a sheet of metal that forms an outer surface of the door. The door skin 110 may include openings 114 for a door handle. A window (not shown) may be mounted between the door skin 110 and the structural member 130. The door skin 110 may be formed, for example, by stamping a metal sheet into a desired shape. A top edge of the door skin. 110 may include a flange 120. The flange 120 may be formed along the edge of the door skin 110 by bending and creasing an edge portion. A window gap 128 may be a space between the door skin 110 and the structural member 130. The window gap 128 may allow the window to raise and lower into the door. The window gap 128 may be measured between the flange 120 and a top edge of the structural member 130. A molding 134 may cover the flange 120 and include an ornamental surface. The molding 134 may also include a wiper 132 that contacts the window and a seal 140 that contacts an outer surface of the door skin 110. The molding 134 may be mounted to the flange via a molding clip 136. In the exemplary embodiment, the molding clip 136 includes a top portion 142 and a bottom portion 144.

Figure 2:
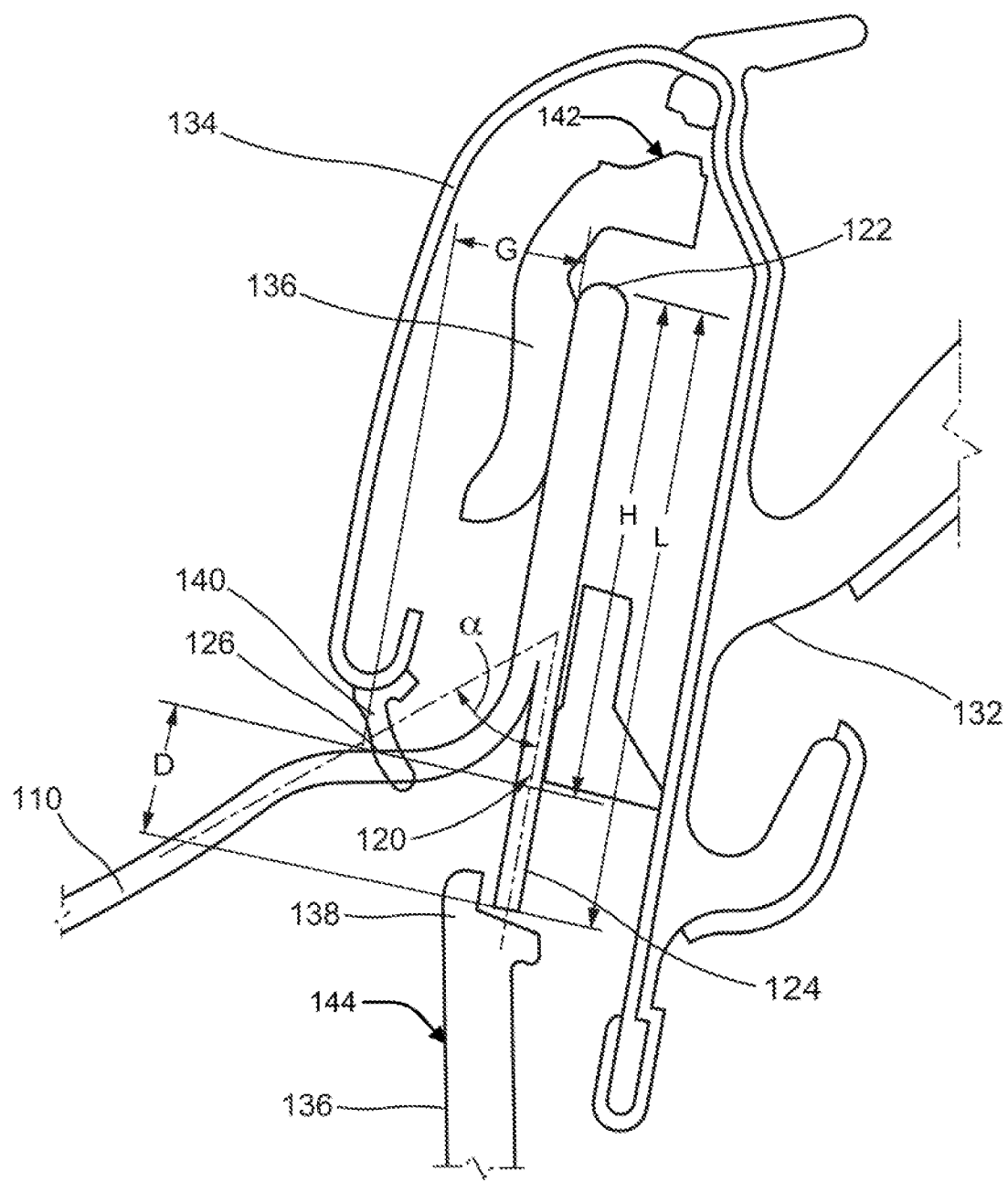
FIG. 2 is a cross-sectional view of a vehicle door showing an example door skin including a flange.

FIG. 2 illustrates a cross-sectional view of the door 100 near the flange 120. The flange 120 may be formed on the door skin 110 by bending the metal sheet back upon itself and forming a crease. Accordingly, the flange 120 may include a creased edge 122 (interchangeably referred to herein as a hemmed edge) where the metal sheet is creased. The creased edge 122 may attach to the top portion 142 of the molding clip 136. The flame 120 may also include a free edge 124 where the metal sheet ends. The free edge 124 may attach to the bottom portion 144 of the molding clip 136. The bottom portion 144 of the molding clip 136 may include a tooth 138 that retains the free edge 124. Additionally, the flange 120 may be oriented at an angle α to an outer surface 126 of the door skin 110. The molding 134 may include a seal 140 that contacts the outer surface 126.

In order to properly retain the door skin 110 in relation to the molding clip 136, the flange 120 may have a length L between the free edge 124 and the creased edge 122. The flange 120 may also have a critical dimension D between the free edge 124 and the outer surface 126. In an aspect, the critical dimension D may be indirectly measured at a distance G from the flange 120. In other words, dimension D can be verified as within a range of a specified dimension if length L has been verified and a distance H from creased edge 122 to the outer surface 126 is also verified as being within a range of a specified dimension. In an aspect, the distance G may indicate the location of the seal 140. The distance G may be specified for a particular vehicle model based on the curvature of the door skin 110 and/or the angle α between the flange 120 and the outer surface 126 of the door skin 110. If the dimension D is too small, the door skin may be inadvertently pulled over the tooth 138. If the dimension D is too large, the molding 134 may contact the outer surface 126 and the molding 134 may not seat properly. Deviation of the flange 120 from the specified dimensions may also cause contact with the window glass, which may result in slower movement of the window glass. Accordingly, it is desirable to ensure that the length L and dimension D are within manufacturing tolerances for a particular vehicle. As an example, door skins may have flanges with a flange length of between approximately 10 mm and 20 mm. The dimension D may be approximately 3 mm to 4 mm and may have a tolerance of approximately 0.5 mm. The distance G may be between approximately 2 mm and 10 mm it should be appreciated that door skins may be designed with different sized flanges and tolerances, but it may still be useful to obtain an accurate measurement of the flange 120 during manufacturing.

The present disclosure provides a tool and method for determining whether a sheet of metal having a folded flange complies with manufacturing specifications. Although the various exemplary aspects may refer to a door skin, it should be appreciated that other vehicle components as well as other construction and manufacturing applications are conceived. For example, sheet metal with flanges may be used for other vehicle panels, building interior or exterior surfaces, fixtures, or appliances.

Figure 3:
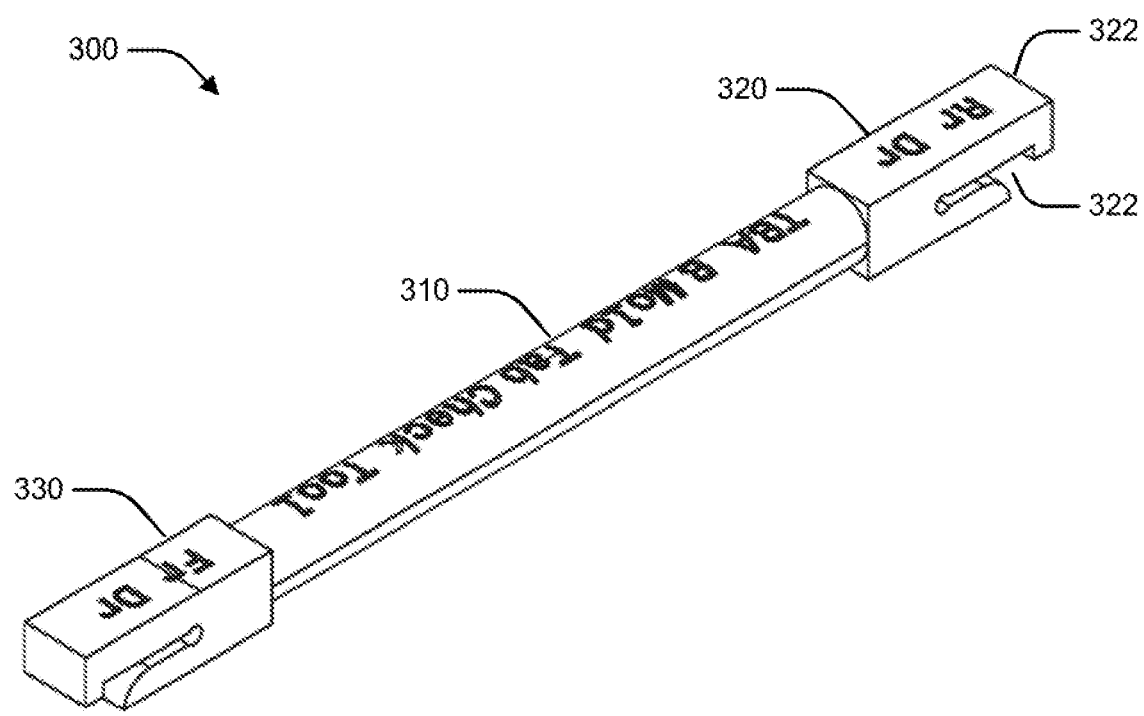
FIG. 3 illustrates a perspective view of an example flange check tool according to an aspect of the disclosure.
Figure 4:
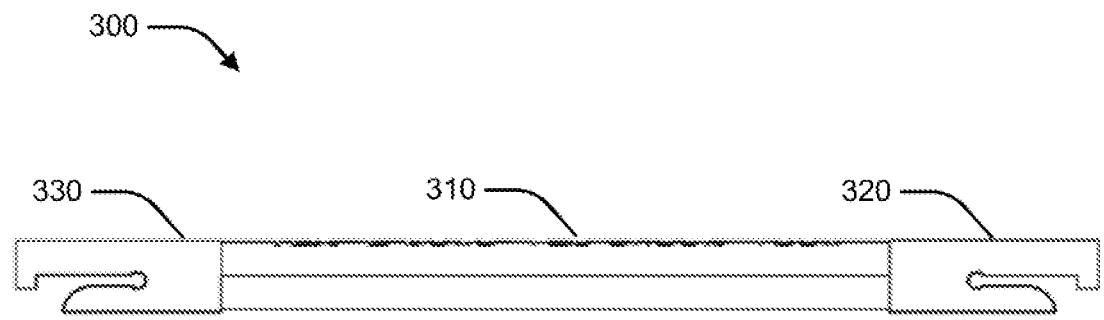
FIG. 4 illustrates a side view of the example flange check tool in FIG. 3.
Figure 5:
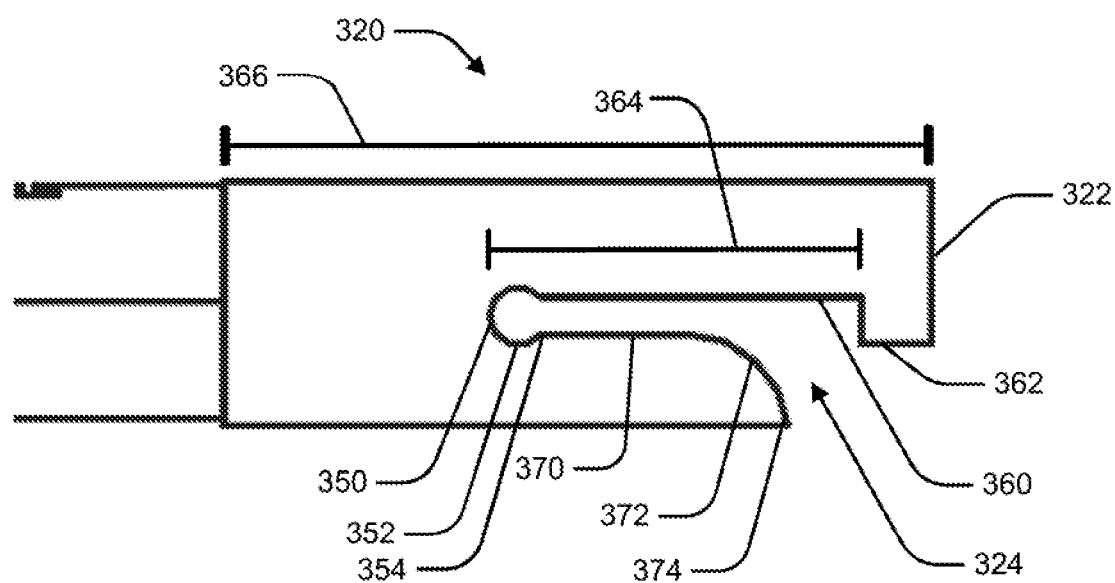
FIG. 5 illustrates an enlarged side view of an end portion of the example flange check tool in FIG. 3.

FIGS. 3-5 illustrate various views of an example of a tool 300. FIG. 3 is a perspective view of the tool 300. FIG. 4 is a side view of the tool 300. FIG. 5 is an enlarged side view of a block portion 320 of the tool 300. The tool 300 may include a handle 310, a first block portion 320, and a second block portion 330.

Referring to FIGS. 3-5, the handle 310 may provide a handle for the first block portion 320. The handle 310 may be cylindrical or any other shape that allows a user to manipulate the tool 300.

The first block portion 320 may generally be a rectangular prism, although other shapes are possible. The first block portion 320 may have an end 322, which may be a distal surface of the tool 300. The first block portion 320 may include a slot 324 extending interiorly from the end 322. The slot 324 may extend from a first side of the first block portion 320 to an opposite side of the first block portion. The first block portion 320 may have a width of approximately 5 cm between the first side and the opposite side. The length of the first block portion 320 from the handle 310 to the end 322 may be longer than the length L. For example, the length of the first block portion 320 may be 150% to 200% of the length or longer.

The block portion 320 may be used to determine whether a flange in a creased metal sheet conforms to specified dimensions. The size and shape of the first block portion 320 and slot 324 may be selected based on the specified dimensions. For example, the illustrated tool 300 may be used to determine whether door skins for a vehicle conform to specified dimensions. For example, the first block portion 320 may be used to check both the front driver side door and the front passenger side door. The door skins may be symmetric and have the same specified dimensions for the flange 120. The second block portion 330 may be used to check both the rear driver side door and the rear passenger side door, which may also be symmetric, but which may have different specified dimensions than the front door skins. Accordingly, the tool 300 may be used to check all of the doors for a vehicle.

Figure 10:
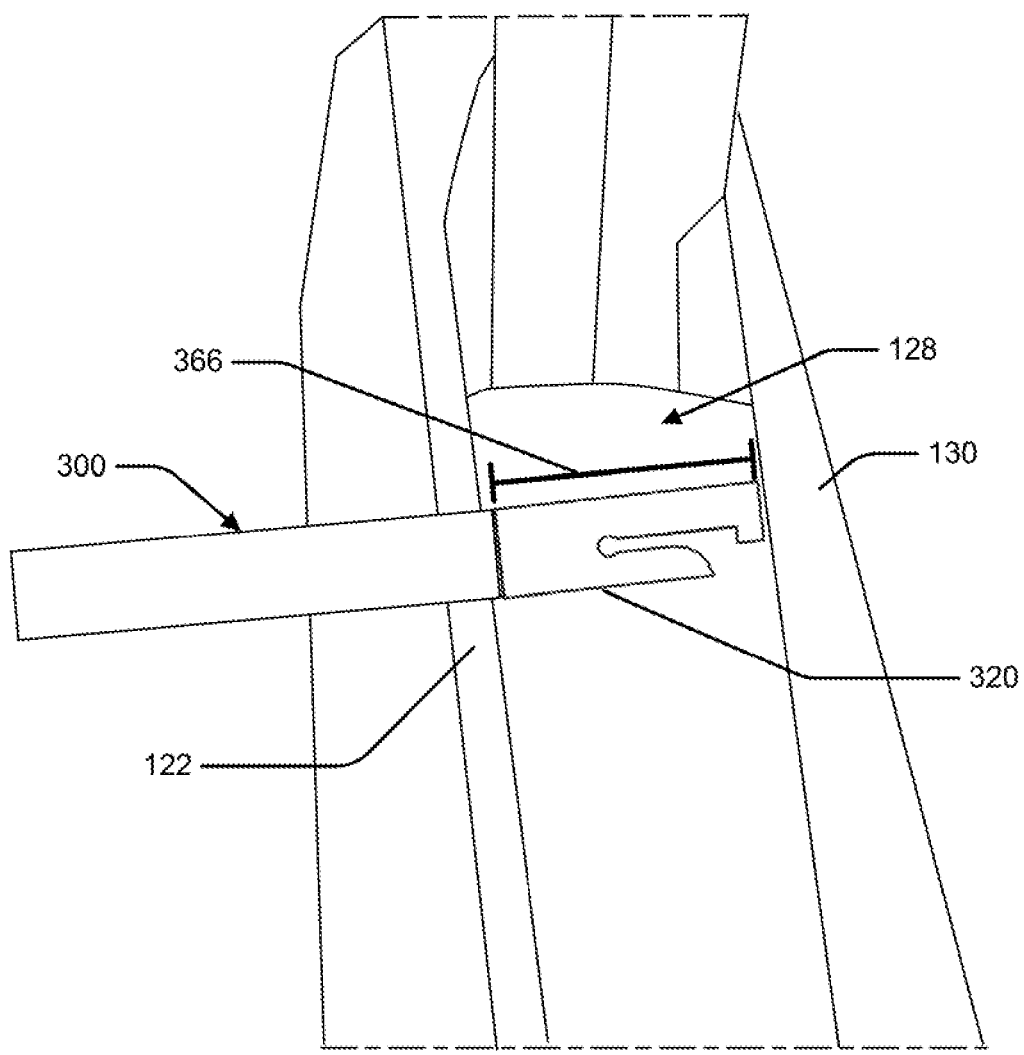
FIG. 10 illustrates a perspective view of the example flange check tool positioned within a window gap, according to an aspect of the disclosure.

As best seen in FIG. 5, the slot 324 may extend to an interior end 350. The interior end 350 may have a generally circular cross-section 352, which may indicate to a user a desired degree of tolerance. The slot 324 may be defined by an interior wall 360 and an exterior wall 370. A shoulder 362 may extend from the interior wall 360 toward the exterior wall 370. The shoulder 362 may be located near the end 322. The shoulder 362 may define a length 364 along the interior wall 360. The length 364 may correspond to a specified length of the flange 120. For example, the length 364 may be a maximum tolerable length of the flange 120, i.e., length L (shown in FIG. 2). A minimum tolerable length of the flange 120 may be measured to an edge 354 of the circular cross-section 352 of the interior end 350. In another aspect, the minimum tolerable length may be marked on a surface of the tool 300. In an aspect, a length 366 of the first block portion 320 may correspond to the width of the window gap 128 and may be used to determine whether the window gap 128 conforms the specified dimension. As shown in FIG. 10, the tool 300 may be aligned with the window gap 128 to check the dimension of the window gap 128. The block portion 320 may be placed between the flange 122 and the structural member 130 to determine whether the window gap 128 complies with the length 366. The exterior wall 370 may include a beveled surface 372 that curves away from the interior wall 360. The beveled surface 372 may correspond to a desired curvature of the door skin 110 near the flange 120. The beveled surface 372 may end at an edge 374, which may correspond to the location of the seal 140. That is, the position of the edge 374 may be based on the distance G from the interior wall 360 and a width of the flange 120.

Figure 6:
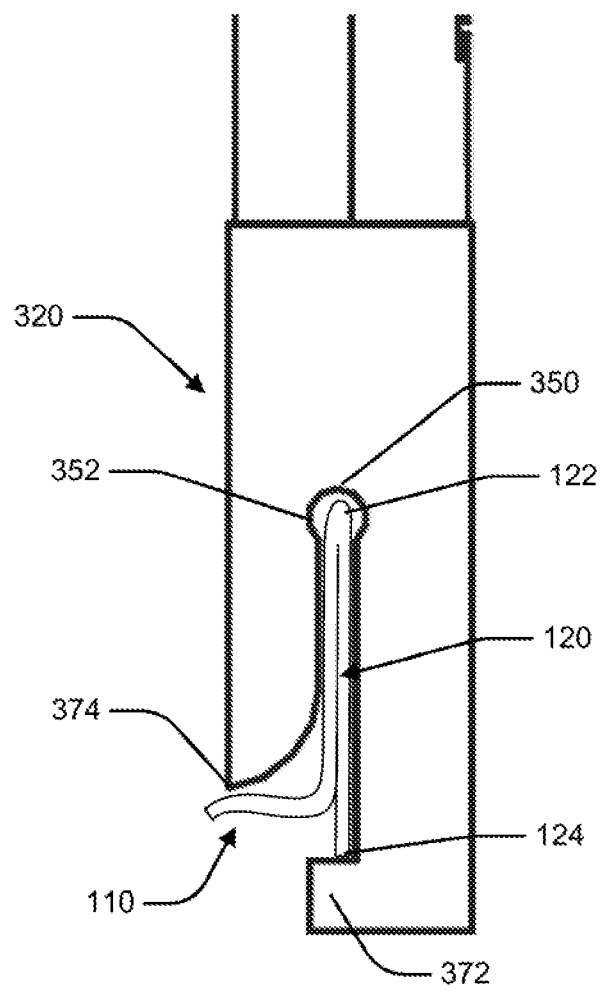
FIG. 6 illustrates a side view of the example flange check tool positioned on a flange, according to an aspect of the disclosure.
Figure 7:
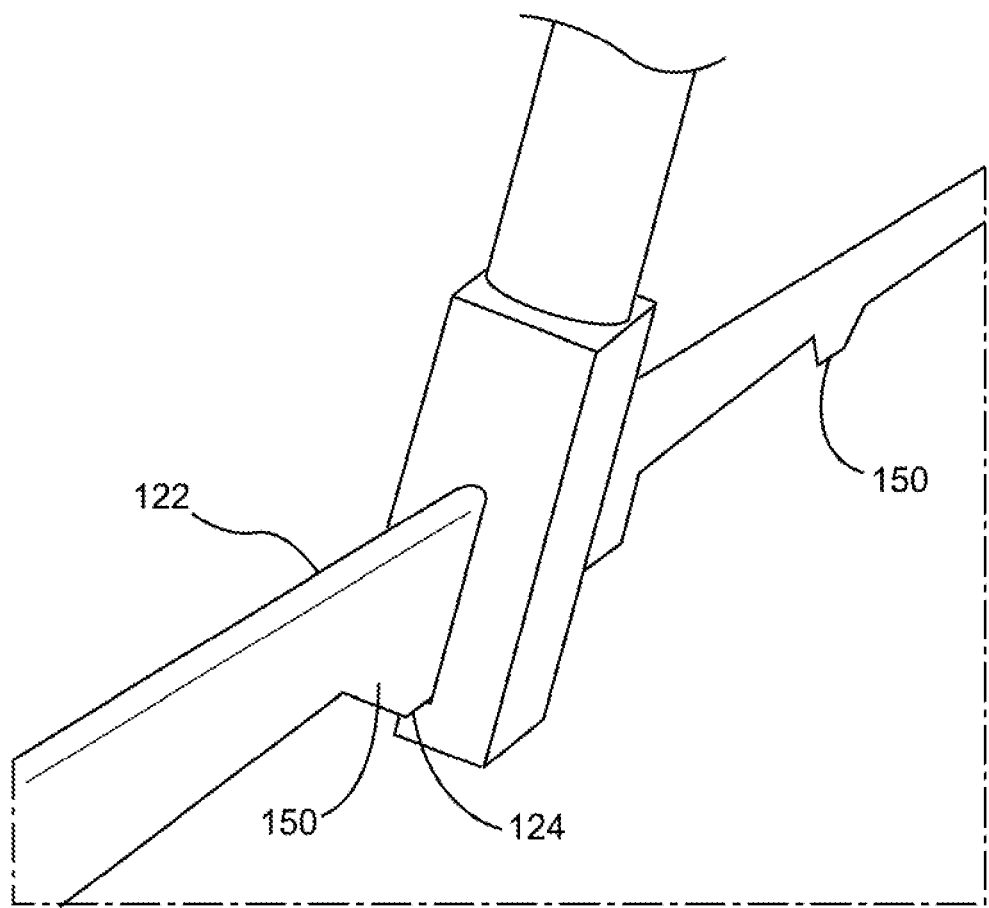
FIG. 7 illustrates a perspective view of the example flange check tool positioned on the flange, according to an aspect of the disclosure.

FIGS. 6 and 7 illustrate the flange 120 inserted into the slot 324 of the block portion 320. FIG. 6 is a rotated side view of the block portion 320 of tool 300 in use with a door skin 110 having a flange 120. FIG. 7 is a perspective view of the block portion 320 of tool 300 in use with a door skin 110 having the flange 120. The free edge 124 may abut the shoulder 362. The creased edge 122 may be located near the interior end 350. As best seen in FIG. 7, the tool 300 may be positioned such that a tab 150 of the flange 120 is located within the slot 324. The tab 150 may be any area where the length of the flange is a local maximum. If the flange 120 conforms to the specified dimensions, there may be a clearance between the creased edge 122 and the interior end 350. For example, the creased edge 122 may be located within the circular cross-section 352. If the flange 120 is intolerably longer than the specified length L, the creased edge 122 may contact the interior end 350, which may cause the block portion 320 to stick or hind when sliding along the flange 120. If the flange 120 is intolerably shorter than the specified length L, the creased edge 122 nay be outside the circular cross-section 352. Similarly, the edge 374 may be located near the surface of the door skin 110. If the flange 120 and door skin 110 conform to the specified dimensions including the distance D and angle α, the edge 374 may clear the surface of the door skin 110. If the flange 120 does not conform to the specified dimensions including the distance D and angle α, the edge 374 may contact the surface of door skin 110 and cause the slot 324 to hind on the flange 120.

The tool 300 may be manufactured using various known techniques and apparatuses. In an example, the tool 300 may be manufactured using an additive manufacturing process such as stereolithography (SLA). The tool 300 may be manufactured from a liquid photopolymer using a laser or other light source to solidify the liquid photopolymer according to a three-dimensional computer aided design (CAD) model of the tool 300. The resulting tool 300 may be a solid polymer. The tool 300 may be used to check flanges on either painted or unpainted metal sheets without damaging the surface. Other example manufacturing processes may use computer numerical control (CNC) machines to subtractively manufacture the tool 300 or parts thereof from one or more solid materials.

Figure 8:
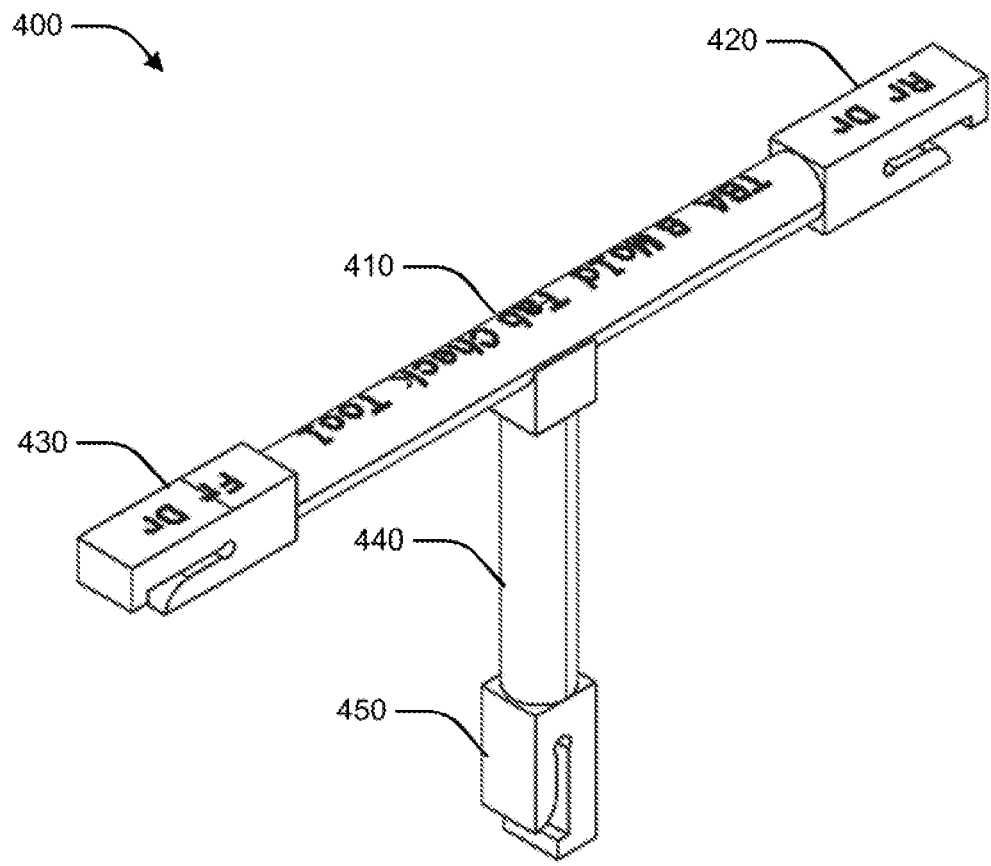
FIG. 8 illustrates another example flange check tool having multiple block portions, according to an aspect of the disclosure.

FIG. 8 illustrates another example of a tool 400 for determining whether at flange complies with specified dimensions. The tool 400 may have a handle 410, first block portion 420, and second block portion 430, which may correspond to the handle 310, first block portion 320, and second block portion 330, respectively. The tool 400 may also include a shaft 440, which may be perpendicular to the handle 410. A third block portion 450 may extend from the shaft 440. The third block portion 450 may be used to determine whether a third door skin conforms to specified dimensions. For example, the third block portion 450 may be used to check both doors on a two-door version of the vehicle. Accordingly, the same tool may be used for any version vehicle. In another implementation, the tool 400 may include additional shafts and end portions.

Figure 9:
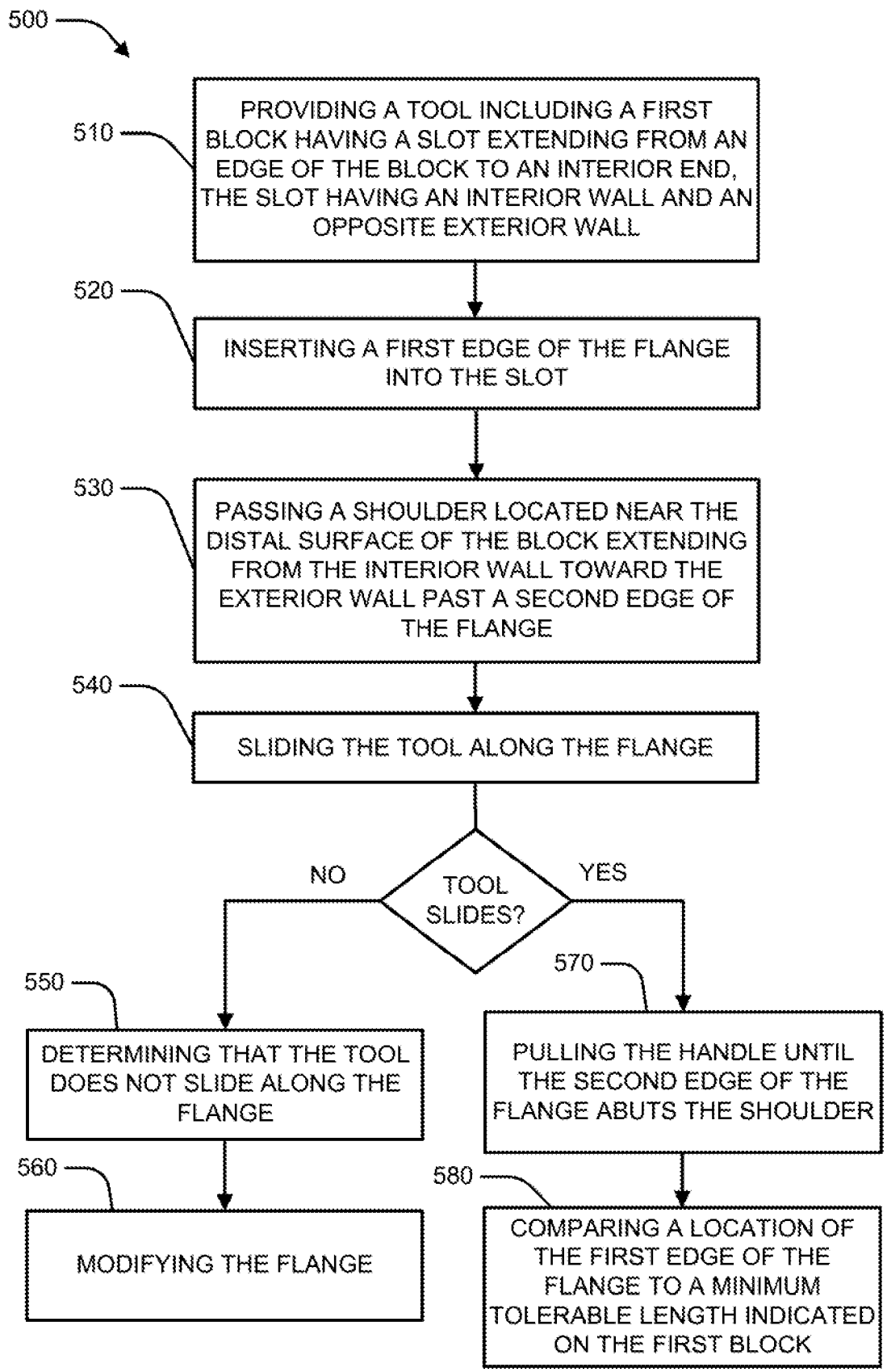
FIG. 9 illustrates a flowchart showing an example method of checking a flange formed in a sheet of metal according to an aspect of the disclosure.

FIG. 9 illustrates a flowchart showing an example of a method 500 for determining whether a flange in a sheet of creased metal satisfies specified dimensions according to an aspect of the disclosure. The method 500 may be performed using the tool 300 or the tool 400. For example, the method 500 may be used to check the flange 120 of the door skin 110 using the tool 300. Optional blocks are shown with dashed lines.

In block 510, the method 500 may include providing a tool including a first block having a slot extending from a distal surface of the block to an interior end, the slot having an interior wall and an opposite exterior wall. In an aspect, for example, the tool 300 including the first block portion 320 having a slot 324 extending from a distal end 322 to an interior end 350. The slot 324 may have an interior wall 360 and an opposite exterior wall 1370.

In block 520, the method 500 may include inserting a first edge of the flange into the slot. In an aspect, for example, a user may insert the creased edge 122 of the flange 120 into the slot 324. The creased edge 122 may be located proximate the interior end 350.

In block 530, the method 500 may include passing a shoulder located near the distal surface of the block extending from the interior wall toward the exterior wall past a second edge of the flange. In an aspect, for example, the user may pass the shoulder 362 past the free edge 124 of the flange 120. The free edge 124 may then abut the shoulder 362.

In block 540, the method 500 may include sliding the tool along the flange. In an aspect, for example, the user may slide the tool 300 along the flange 120. The user may exert a lateral force on the handle 310.

In block 550, the method 500 may optionally include determining whether the tool slides along the flange. In an aspect, for example, the user may determine whether the tool 300 slides along the flange 120. In an aspect, the user may determine that the tool 300 does not slide along the flange 120 when a force applied to the tool 300 exceeds a threshold without the tool moving. For example., the threshold may be approximately 10 newtons. In another example, the handle 310 may bend or break when the force exceeds the threshold.

In block 560, the method 500 may optionally include determining that the tool does not slide along the flange. In an aspect, for example, the user may determine that the tool 300 does not slide along the flange 120. For example, the user may determine that the tool 300 has bound on the flange 120 due to friction. In an aspect, the tool 300 may bind on the flange 120 when the flange length L exceeds the specified dimension and the creased edge contacts the interior end 350. In another aspect, the tool 300 may bind when the edge 374 contacts the door skin 110.

In block 570, the method 500 may optionally include modifying the flange in response to determining that the tool does not slide along the flange. In an aspect for example, the user may modify the flange in response to determining that the tool 300 does not slide along the flange 120. For example, the user may trim, grind, or bend the flange 120. The user may trim or grind the flange in response to determining that a flange length is too great. The user may bend the flange 120 to reduce a flange angle in response to determining that a flange angle is too great.

In block 580, the method 500 may include pulling the handle until the second edge of the flange abuts the shoulder. In an aspect, for example, the user may pull the handle 310 vertically until the free edge 124 abuts the shoulder 372. Accordingly, any clearance between the flange 120 and the slot 324 may be proximate the interior end 350.

In block 590, the method 500 may include comparing a location of the first edge of the flange to a minimum tolerable length indicated on the first block. In an aspect, for example, the user may compare a location of the creased edge 122 of the flange 120 to the minimum tolerable length indicated on the first block 320. For example, the minimum tolerable length may be indicated by the circular cross-section 352 of the interior end 350. If the creased edge 122 is within the circular cross-section, the flange dimensions may be acceptable. If the creased edge 122 is outside of the circular cross-section, the flange 120 may be too short. If the creased edge 122 is too short, the method 500 may proceed to block 570 to modify the flange.

It will be appreciated that various implementations of the above-disclosed and other features and functions, or alternatives or varieties thereof, may be desirably combined many other different systems or applications. Also that various presently unforeseen or unanticipated alternatives, modifications, variations, or improvements therein may be subsequently made by those skilled in the art which are also intended to be encompassed by the following claims.

What is claimed is:

1. An apparatus for checking whether a flange in a creased sheet of metal conforms to specified dimensions, comprising:
    a handle;
    a first block extending from the handle, the first block including:
        a slot extending from a distal surface of the block to an interior end, the slot having an interior wall and an opposite exterior wall;
        a shoulder located near the distal surface of the block extending from the interior wall toward the exterior wall and defining a length between the shoulder and the interior end along the interior wall, the length corresponding to a specified length of the flange; and
        a beveled edge on the exterior wall facing the interior wall, wherein a distance between the beveled edge and the interior wall corresponds to a specified distance between a surface of the sheet and the flange.

2. The apparatus of claim 1, wherein the creased sheet of metal is a vehicle door skin for a first door of a vehicle.

3. The apparatus of claim 2, further comprising a second block extending from the handle, the second block including a second slot having dimensions corresponding to specified dimensions of a second vehicle door skin for a second door of the vehicle.

4. The apparatus of claim 3, further comprising a third block extending from the handle, the third block including a third slot having dimensions corresponding to specified dimensions of a third vehicle door skin for a second vehicle.

5. The apparatus of claim 2, wherein the beveled edge corresponds to a location of a seal that contacts the door skin.

6. The apparatus of claim 2, wherein the first block has a length between the distal surface and the handle that corresponds to a specified width of a window gap between the door skin and a structural door member.

7. The apparatus of claim 1, wherein the first block is formed of a solid polymer.

8. The apparatus of claim 1, wherein the interior end of the slot has a generally circular cross-section indicating a tolerance for the specified length of the flange.

9. The apparatus of claim 8, wherein the length between the shoulder and the interior end is a maximum tolerable length of the flange and a length between the shoulder and an edge of the circular cross-section is a minimum tolerable length of the flange.

10. A method of measuring a flange in a creased sheet of metal, comprising:
    providing a tool including a handle and a first block having a slot extending from a distal surface of the block opposite the handle to an interior end, the slot having an interior wall and an opposite exterior wall;
    inserting a first edge of the flange into the slot;
    passing a shoulder located near the edge of the block extending from the interior wall toward the exterior wall past a second edge of the flange; and
    sliding the tool along the flange.

11. The method of claim 10, further comprising:
    determining that the flange length is too long when the tool is unable to slide along the flange.

12. The method of claim 11, further comprising modifying the flange.

13. The method of claim 10, further comprising:
    pulling the handle until the second edge of the flange abuts the shoulder; and
    comparing a location of the first edge of the flange to a minimum tolerable length indicated on the first block.

14. The method of claim 13, wherein the minimum tolerable length is indicated by a circular cross-section of the internal end.

15. The method of claim 10, further comprising:
    determining that a flange angle is too great when a beveled edge on the exterior wall facing the interior wall contacts a surface of the sheet.

16. The method of claim 15, wherein the contact between the beveled edge and the surface of the sheet causes the flange to bind within the slot.

17. The method of claim 15, further comprising bending the flange to reduce the flange angle.

18. The method of claim 10, wherein the first block has a length between the distal surface and the handle that corresponds to a specified width of a window gap between the door skin and a structural door member, the method further comprising placing the first block within the window gap.

19. A vehicle door assembly comprising:
a structural door member;
a metal door skin spaced apart from the structural door member to define a window gap between the door skin and the structural door member, the metal door skin including a flange having specified dimensions formed by bending the metal door skin back upon itself and forming a crease; and
a measurement tool attached to the flange, wherein the measurement tool comprises:
a handle;
a first block extending from the handle, the first block including:
a slot extending from a distal surface of the block to an interior end, the slot having an interior wall and an opposite exterior wall;
a shoulder located near the distal surface of the block extending from the interior wall toward the exterior wall and defining a length between the shoulder and the interior end along the interior wall, the length corresponding to a specified length of the flange; and
a beveled edge on the exterior wall facing the interior wall, wherein a distance between the beveled edge and the interior wall corresponds to a specified distance between a surface of the sheet and the flange,
wherein the measurement tool is positioned on the door skin with the flange within the slot.

20. The vehicle door assembly of claim 19, wherein the first block has a length between the distal surface and the handle that corresponds to a specified width of the window gap between the door skin and the structural door member.

* * * * *